Patented Dec. 23, 1952

2,623,060

UNITED STATES PATENT OFFICE 2,623,060

ALKYLIDENECYANOACETATES AND IMPROVED PROCESS FOR PREPARATION THEREOF

Edward J. Cragoe, Jr., Ridley Park, Pa., assignor to Sharp & Dohme, Incorporated, Philadelphia, Pa., a corporation of Maryland No Drawing. Application November 4, 1949, Serial No. 125,643

8 Claims. (Cl. 260—465)

This invention is concerned broadly with certain new alkylidenecyanoacetic esters and an improved method for their production. It is particularly concerned with an improvement in the application of the Knoevenagel reaction whereby it is possible to obtain in satisfactory yields, heretofore unknown diarylmethylenecyanoacetic acid esters, aryl-alkylidenecyanoacetic acid esters and certain alkylidenecyanoacetic acid esters, the latter obtained by the condensation of cyanoacetic acid esters and inert or inhibited ketones heretofore found unreactive in the Knoevenagel reaction. The invention is particularly concerned, in addition to the process just described, with the new and novel compounds resulting therefrom, which compounds for the purposes of this application, are included in the term alkylidenecyanoacetic acid esters.

The phase of the Knoevenagel reaction with which this invention is concerned embraces the catalytic condensation of ketones with cyanoacetic acid esters. The term "Knoevenagel reaction," as used herein, should be understood to be so limited in scope.

Relatively simple dialkyl ketones undergo the reaction readily and a number of basic substances are suitable catalysts. However, as the ketone becomes more complex, as in the case of aryl alkyl ketones, the most suitable catalyst is ammonium acetate. As the complexity of the ketone further increases the applicability of the reaction markedly decreases. For example, in the case of diaryl ketones, heretofore only one member of this type ketone was known to be reactive, that is, diphenyl ketone. Further, the Knoevenagel reaction, as heretofore known, involving a substituted-diaryl ketone is not reported.

The Knoevenagel reaction as heretofore known consists in mixing together the desired ketone, a cyanoacetic acid ester, a catalyst such as ammonium acetate or acetamide, acetic acid and a solvent suitable to effect the removal of the water formed by the reaction such as a benzene, toluene, xylene, chloroform, refluxing the reaction mixture until no further water is evolved, and then isolating the alkylidenecyanoacetic acid ester.

In investigating the applicability of this reaction outlined above to substituted diaryl ketones and complex or hindered ketones of the aryl alkyl or dialkyl types, it was found that acetamide was completely inactive as a catalyst and further, that the yields of alkylidenecyanoacetic acid esters were, in general, poor.

However, it was discovered, as a feature of this invention, that it was possible to modify the Knoevenagel reaction as presently known so as to obtain definitely satisfactory yields from diaryl ketones, aryl alkyl and hindered dialkyl ketones and also to react certain ketones heretofore reported as not entering into the Knoevenagel reaction. Further it was found to be possible to cause ketones containing a heterocyclic radical to enter into the Knoevenagel reaction as modified by this invention. An example of such a ketone is 2-thienyl phenyl ketone. Examples of other suitable heterocyclic ketones are 2-thienyl methyl ketone, 2-furyl phenyl ketone and 2-furyl tolyl ketones.

The modification of the reaction embraced by this invention involves using a slight excess of the cyanoacetic acid ester and adding the catalyst portionwise to the reaction at intervals until the reaction is complete. The novel, modified Knoevenagel procedure embraced by this invention, consists in mixing together a cyanoacetic acid ester, the desired ketone, ammonium acetate catalyst, acetic acid and a solvent suitable for removal of water and refluxing the reaction mixture until the rate of evolution of water falls markedly at which time more catalyst is added. This procedure of adding catalyst is repeated until the volume of water evolved per catalyst addition period reaches a minimum and becomes constant. When the volume of water evolved becomes equal to that which can be accounted for by the decomposition to the catalyst alone, the reaction is complete. The reaction time varies with the reactivity of the particular ketone involved, for example, from three to approximately 120 hours.

It is to be noted that various solvents are suitable for use in the reaction. Toluene and xylene, accomplish the removal of water and, because they boil at a higher temperature than benzene, increase the reaction rate. It has been found, however, that side reactions are minimized by the use of benzene, the solvent of choice. It is preferable to carry out the reaction at atmospheric pressure. It is possible to vary the temperature of the reaction by conducting the reaction under vacuum or pressure.

Chloroform has been used in the reaction, but this necessitates the use of special apparatus for the removal of water since chloroform is heavier than water.

Attention is directed to the relationship between the acetic acid and catalyst. It has been discovered that the best yields are obtained when the ratio of weights of ammonium acetate catalyst and acetic acid is not greater than 0.75/1.0.

It has been found desirable to use as little catalyst as will suffice to complete the reaction. Thus, the ratio of weights of ammonium acetate catalyst and acetic acid solvent can be a minimum quantity and is preferably not greater substantially than 0.75/1.0.

The amounts of reactants, catalyst and solvents vary with the reactivity of the ketone used. For the relatively active ketones it has been found advantageous to use the following amounts per mole of ketone: a cyanoacetate, 1.0–1.2 moles; glacial acetic acid, 0.8–1.0 mole; benzene, 200 ml., ammonium acetate catalyst, 0.25 to 0.8 mole depending on the reaction time. The catalyst is added in small portions, approximately 3–4 gm. as above described until the reaction is complete.

For the more inert or unreactive ketones it has been found to be advantageous to use the following amounts per mole of ketone: a cyanoacetate, 1.2–2.0 moles; glacial acetic acid, 1.0–1.6 moles; benzene, 400 ml.; ammonium acetate catalyst, 0.75 to 1.2 moles depending on the reaction time.

By use of this modified procedure it is possible to obtain satisfactory yields from various substituted-diaryl ketones, ketones containing a heterocyclic radical and inhibited ketones, the latter of which are illustrated by, for example, the hindered aliphatic ketones, pinacolone and camphor. Whereas camphor has been reported to be completely unreactive, it is possible now, using the process of this invention, to obtain 37% yield of the alkylidene cyanoacetic acid ester. Similarly, although pinacolone has been reported completely unreactive, using the process of this invention, it is possible to obtain 13.2% yield of the 3,3-dimethyl-2-butylidenecyanoacetic acid ester.

Examples of alkylidene cyanoacetates which can be obtained by the modified Knoevenagel reaction of this invention are:

methylenecyanoacetate in 84% yield. Similarly, the yields of all diarylmethylenecyanoacetates are markedly greater using the process of this invention instead of the Knoevenagel reaction as heretofore known. It is particularly pertinent to note that a further feature of this invention is making the Knoevenagel reaction applicable to inhibited ketones heretofore unreactive in the reaction, for example, pinacolone. This illustrates the applicability of the process of this invention to inhibited aliphatic ketones, particularly those containing a tertiary alkyl group linked to the carbonyl carbon atom of the ketone. Previously, ketones of this type were reported not to enter into the Knoevenagel reaction.

Further, a feature of this invention is the extension of the Knoevenagel reaction to substituted-cycloaliphatic ketones such as camphor, and to fluorenone, and to ketones containing a heterocyclic radical.

The compounds of this invention find particular utility as starting materials for production of certain therapeutically useful chemical compounds. For instance, the alkylidenecyanoacetates embraced by this invention, by addition of hydrogen cyanide and subsequent hydrolysis, are converted to $\alpha,\alpha$-disubstituted succinic acids which are therapeutically useful and which are described in the co-pending application of myself and James M. Sprague filed herewith and entitled "$\alpha,\alpha$-Disubstituted-Succinic Acids and Anhydrides." Further, starting with the compounds of this invention, it is possible by known chemical reactions, to obtain a variety of $\beta$-disubstituted-monobasic acids, $\beta,\beta$-disubstituted-$\alpha$-cyanopropionic acids, $\beta,\beta$-disubstituted-propionitriles; $\alpha$-substituted-$\beta$-alanines, as well as various barbituric and thiobarbituric acids. Thus, it is to be noted that there are made available as starting materials for a variety of chemical syn-

| Compound | B. P. | | M. P. °C. | $n_D^{25}$ |
| --- | --- | --- | --- | --- |
| | °C. | mm. Hg | | |
| Ethyl phenyl(4-chlorophenyl)methylenecyanoacetate | 160–180 | 0.15 | 110–111 | |
| Ethyl di(4-chlorophenyl)methylenecyanoacetate | 185–192 | 0.13 | 88–89 | |
| Ethyl (2-chlorophenyl) (4-chlorophenyl) methylenecyanoacetate | 190–5 | 0.18 | 105–106 | |
| Ethyl phenyl (4-methoxyphenyl)-methylenecyanoacetate | 187 | 0.07 | | |
| Ethyl phenyl (2-thienyl)methylenecyanoacetate | 185–8 | 2 | 77–78 | |
| Ethyl 2-camphanylidenecyanoacetate | 121–2 | 0.05 | 86–87 | |
| Ethyl 3, 3-dimethyl-2-butylidenecyanoacetate | 127–130 | 12 | | 1.4680 |
| Ethyl 9-fluorenylidenecyanoacetate | 194–6 | 0.09 | 58–60 | |
| Ethyl di-(phenethyl)methylenecyanoacetate | 184–7 | 0.1 | | 1.5565 |
| Ethyl 1-(4-hydroxyphenyl)propylidenecyanoacetate | 185–8 | 0.1 | 92–93.5 | |
| Ethyl 1-phenyl-3-cyclohexylpropylidenecyanoacetate | 174–7 | 1 | | 1.5371 |
| Ethyl 1-phenyl-6-cyclohexylhexylidenecyanoacetate | 190–5 | 0.1 | | 1.5260 |
| Ethyl 1-(4-butylphenyl)heptylidenecyanoacetate | 180–5 | 1 | | 1.5159 |

The above compounds are illustrative of the scope of this invention as they demonstrate the applicability of the process to a variety of diaryl ketones, ketones containing heterocyclic radicals and inert or inhibited ketones. The benefit to be derived from the processes of this invention is illustrated by the fact that when diphenyl ketone is condensed according to the Knoevenagel reaction in the manner heretofore known, a 66% yield of ethyl diphenylmethylenecyanoacetate is obtained. However, using the process of this invention it is possible to obtain ethyl diphenyltheses, disubstituted - methylenecyanoacetates heretofore unknown.

The invention is illustrated by, but not restricted to, the following examples:

*Example 1.—Preparation of ethyl (2-chlorophenyl) (4 - chlorophenyl) methylenecyanoacetate.*—Ethyl cyanoacetate (103.0 gms., 0.912 mole), 2,4'-dichlorobenzophenone (190.2 gms., 0.76 mole), acetic acid (36.5 gms., 0.61 mole) and benzene (150 mls.) were placed in a flask attached to a modified Dean and Stark constant water separator. The mixture was vigorously refluxed and ammonium acetate catalyst (50 gms., 0.65 mole) was added in small portions (approximately 2–3 gms.) at about four hour intervals over a period of 92 hours. (Before each addition of catalyst the water layer was removed from the separator.) As the reaction progressed, the volume of the aqueous layer that separated during each time interval slowly decreased. At the end of the reaction the volume of the aqueous layer formed per time interval had become constant.

The reaction mixture was cooled, washed with water (three 200 ml. portions) and dried over anhydrous sodium sulfate. The benzene was removed by distillation and the residue fractionated at reduced pressure. A total of 121 gms. (46%) of material boiling at 176–205° C. at 0.1 mm. of Hg pressure was obtained. Refractionation gave 107.2 g. (41%) boiling at 168–185° C. at 0.1 mm. Hg pressure. Recrystallization of the solid, that forms on standing, from ethanol gave the desired product, a white solid, M. P. 105–106° C.

*Example 2.—Preparation of ethyl phenyl(2-thienyl)methylenecyanoacetate.* — Ethyl cyanoacetate (135.7 gms., 1.2 moles), 2-benzoylthiophene (188.2 gms., 1 mole), acetic acid (48 gms., 0.8 mole) and benzene (200 mls.) were allowed to react as described in Example 1. The ammonium acetate catalyst (44 gms., 0.5 mole) was added portionwise over 47 hours. The product was isolated as in Example 1. The yield was 150 gms. (53%) of ethyl phenyl(2-thienyl)methylenecyanoacetate boiling at 160–195° C. at 1.5 mm. Hg. Refractionation gave 138 gms. (49%) boiling at 150–186° at 0.2 mm., M. P. 62–64°. Recrystallization from aqueous alcohol and finally from cyclohexane gave the desired product which melted at 77–78° C.

Similarly, di(2-thienyl) ketone, 2-thienyl methyl ketone, 2-furyl phenyl ketone, 2-furyl tolyl ketone and other ketones containing heterocyclic radicals can be substituted in identical molar quantities in the above example for 2-benzoylthiophene to obtain various heterocyclic-substituted-alkylidenecyanoacetates.

*Example 3.—Preparation of ethyl phenyl(p-methoxyphenyl)methylenecyanoacetate.* — This compound was prepared in a manner similar to that described in Example 1 using: p-methoxybenzophenone (106 gms., 0.5 mole), ethyl cyanoacetate (67.8 gms., 0.6 mole), acetic acid (24 gms., 0.4 mole) and benzene (100 mls.). Ammonium acetate catalyst (13 gms., 0.17 mole) was added portionwise at about four hour intervals over 32 hours. A total of 115.4 gms. (75%) of twice fractionated ethyl phenyl(p-methoxyphenyl)methylenecyanoacetate boiling at 187–197° at 0.08 mm. Hg was obtained.

Similarly, other ethyl alkyl(substituted-aryl)-methylenecyanoacetates can be prepared by substituting, in the above procedure, the appropriate ketone. For example, starting with p-hydroxyphenyl ethyl ketone there is obtained ethyl p-hydroxyphenyl propylidenecyanoacetate. When p-butylphenyl hexyl ketone is used there is obtained ethyl 1-(p-butylphenyl) heptylidenecyanoacetate.

*Example 4.—Preparation of ethyl 9-fluorenylidenecyanoacetate.*—This compound was synthesized in a manner similar to that described in Example 1 using: fluorenone (45.05 gms., 0.25 mole), ethyl cyanoacetae (33.9 gms., 0.3 mole) acetic acid (12 gms., 0.25 mole) and benzene (50 mls.). Ammonium acetate catalyst (8 gms., 0.104 mole) was added portionwise at about four hour intervals over 22 hours. Sixty grams of material boiling at 180–193° C. at 0.05 mm. Hg obtained on fractionation was refractionated giving 52.4 gms. (76%) of ethyl 9-fluorenylidenecyanoacetate boiling at 194–196° at 0.1 mm. Hg, M. P. 58–60° C.

*Example 5.—Preparation of ethyl di(phenethyl) methylenecyanoacetate.*—This compound was prepared in a manner similar to that described in Example 1 except that toluene was substituted for benzene as the water-removing solvent. Ethyl cyanoacetate (54.2 gms., 0.48 mole), 1,5-diphenyl-3-pentanone (95.2 gms., 0.4 mole), acetic acid (19.2 gms., 0.32 mole) and toluene (80 mls.) were allowed to react in the usual fashion. Ammonium acetate (8 gms., 0.104 mole) was added in two (4 gms.) portions, the first one at the beginning of the reaction and the second after two hours. The reaction was complete in four hours. A total of 103.2 gms. (81%), of material boiling at 180–205° at 0.3 mm. Hg was obtained. Refractionation gave 91 gms. (68%) of ethyl di(phenethyl) methylenecyanoacetate boiling at 187–192° at 0.25 mm. Hg, $n_D^{25}$=1.5567.

Similarly, 1-phenyl-3-hexanone can be substituted in identical molar quantity in the above example for 1,5-diphenyl-3-pentanone to yield ethyl 1-(phenethyl) butylidenecyanoacetate.

*Example 6—Preparation of ethyl 1-phenyl(6-cyclohexyl) hexylidenecyanoacetate.* — The compound was prepared in a manner similar to that described in Example 1. Ethyl cyanoacetate (27.2 gms., 0.24 mole), 1-phenyl-6-cyclohexyl-1-hexanone (51.86 gms., 0.2 mole), acetic acid (9.6 gms., 0.16 mole) and benzene (40 mls.) were allowed to react in the usual fashion. Ammonium acetate (8 gms., 0.104 mole) was added portionwise at about 4 hour intervals over 26 hours. The yield of ethyl 1-phenyl(6-cyclohexyl) hexylidenecyanoacetate boiling at 190–195° at 0.1 mm. Hg was 47.4 gms. (67%) $n_D^{25}$=1.5260.

*Example 7.—Preparation of ethyl di(phenyl)-methylenecyanoacetate.* — This compound was prepared in a manner similar to that described in Example 1. Ethyl cyanoacetate (67.8 gms., 0.6 mole), benzophenone (91.0 gms., 0.5 mole), glacial acetic acid (24 gms., 0.4 mole), benzene (100 mls.) and ammonium acetate (10 gms., 0.13 mole) were used. The ammonium acetate was added portionwise (about 1 gm. portions) at regular intervals (about 4 hours) over a period of 36 hours. The mixture was refluxed for another seven hours during which the separation of water completely ceased (and solid acetamide separated from the aqueous phase). The product was isolated in the usual fashion. A total of 116.1 gms. (84%) of material boiling at 170–180° C. at 1–2 mm. Hg pressure, M. P. 92–5° C., was collected. Recrystallization from n-heptane gives white crystals of ethyl di(phenyl)methylenecyanoacetate M. P. 95–97°.

*Example 8.—Preparation of ethyl 2-camphanylidenecyanoacetate.* — Ethyl cyanoacetate (56.5 gms., 0.5 mole), camphor (38.06 g., 0.25 mole), acetic acid (24 gms., 0.4 mole) and benzene (100 mls.) were placed in a flask fitted with a modified Dean and Stark constant water separator. The mixture was vigorously refluxed and ammonium acetate (16 gms., 0.208 mole) was added portionwise (1 gm. every four hours) for 64 hours. After another 5 hours the reaction was stopped. During the reaction period the aqueous layer that separated was removed before each addition of catalyst. As the reaction neared completion the volume of the aqueous layer slowly decreased and at the end of the reaction acetamide separated upon cooling the aqueous layer.

The reaction mixture was cooled, washed with water (three 100 ml. portions) and dried over anhydrous sodium sulfate. The benzene was removed by distillation and the residue fractionated at reduced pressure. A total of 22.9 gms. (37%) of material boiling at 125–127° at 0.05 mm. Hg was obtained. Recrystallization from aqueous alcohol gave ethyl 2-camphanylidenecyanoacetate melting at 85.5–86.5° C.

*Example 9.—Preparation of ethyl 3,3-dimethyl-2-butylidenecyanoacetate.*—This compound was synthesized in a manner similar to that described in Example 8. Pinacolone (50.1 gms., 0.5 mole), ethyl cyanoacetate (113.1 gms., 1.0 mole), glacial acetic acid (48 gms., 0.8 mole) and benzene (200 mls.) were allowed to react in the usual fashion. Ammonium acetate (29 gms., 0.38 mole) was added portionwise (about every three hours) over a period of 81 hours. After fractionation three times, there was obtained 12.9 gms. (13%) of material boiling at 127–145° at 12 mm. Hg. Further refractionation gave ethyl 3,3-dimethyl-2-butylidenecyanoacetate boiling at 127–130° at 12 mm. Hg $n_D^{25}=1.4680$.

*Example 10.—Preparation of ethyl phenyl-2-chlorophenylmethylenecyanoacetate.*—This compound was prepared in a manner similar to that described in Example 1, substituting for the 2,4'-dichlorobenzophenone of Example 1 an equal molar quantity (0.76 mole) of 2-chlorobenzophenone. There was obtained ethyl phenyl-2-chlorophenylmethylenecyanoacetate.

It is to be understood that any of the esters of cyanoacetic acid are utilizable in the above examples in place of the ethyl ester.

What is claimed is:

1. A process for the production of alkylidenecyanoacetates comprising refluxing and continuously removing water from a mixture comprising a ketone selected from the class consisting of aryl alkylketones and diaryl ketones in which the aryl nucleus contains less than 11 carbon atoms, dialkyl and cycloaliphatic ketones containing a tertiary alkyl radical attached to the carbonyl group, diaralkyl ketones and ketones containing at least one heterocyclic radical chosen from the class consisting of thienyl and furfuryl, with a cyanoacetate, acetic acid, a solvent capable of removing water, ammonium acetate catalyst, adding thereto portions of catalyst at intervals upon diminished water evolution rate until a relatively constant, diminished rate of water evolution evidences completion of the reaction and recovering the alkylidenecyanoacetate from the mixture.

2. A process for the production of alkylidenecyanoacetates comprising admixing a ketone chosen from the class consisting of aryl alkyl ketones and diaryl ketones in which the aryl nucleus contains less than 11 carbon atoms, dialkyl and cycloaliphatic ketones containing a tertiary alkyl radical attached to the carbonyl group, diaralkyl ketones, and ketones containing at least one heterocyclic radical in which the heterocyclic radical is chosen from a class consisting of thienyl and furfuryl, with a cyanoacetate, acetic acid, a solvent capable of removing water, refluxing and continuously removing water from said mixture and adding thereto ammonium acetate catalyst in the ratio of catalyst to acetic acid of not greater than 1:1 by weight portionwise at intervals upon diminished water evolution rate until a relatively constant, diminished rate of water evolution evidences completion of the reaction and recovering the alkylidenecyanoacetate from the mixture.

3. A compound chosen from the class consisting of

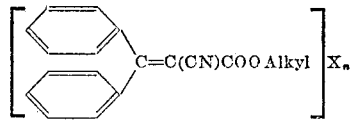

in which X is a nuclear substituent and is chosen from the class consisting of chlorine, lower alkyl, alkoxy, and hydroxy and $n$ is at least 1 and less than 4.

4. Ethyl (2 - chlorophenyl)(4 - chlorophenyl)-methylenecyanoacetate.

5. Ethyl phenyl - 2 - chlorophenylmethylene - cyanoacetate.

6. Ethyl phenyl - 4 - chlorophenylmethylene - cyanoacetate.

7. Ethyl 4,4' - dichlorophenylmethylenecyanoacetate.

8. Ethyl phenyl-4-methoxyphenylmethylenecyanoacetate.

EDWARD J. CRAGOE, JR.

REFERENCES CITED

The following references are of record in the file of this patent:

UNITED STATES PATENTS

| Number | Name | Date |
|---|---|---|
| 2,150,154 | Cope | Mar. 14, 1939 |
| 2,176,018 | Cope et al. | Oct. 10, 1939 |
| 2,381,882 | Cupery | Aug. 14, 1945 |
| 2,468,352 | Warner et al. | Apr. 26, 1949 |

FOREIGN PATENTS

| Number | Country | Date |
|---|---|---|
| 838,851 | France | Mar. 17, 1939 |

OTHER REFERENCES

Haworth et al., Beilstein (Handbuch, 4th Ed., 1st. sup.), vol. II, page 254 (1929).